Dec. 8, 1970 P. O. NICODEMUS 3,546,014

METHOD FOR MAKING THIN WALL INSULATED WIRE

Filed March 1, 1967

INVENTOR
PAUL O. NICODEMUS
BY R. Jonathan Peters
ATTORNEY

United States Patent Office 3,546,014
Patented Dec. 8, 1970

3,546,014
METHOD FOR MAKING THIN WALL INSULATED WIRE

Paul O. Nicodemus, Chelmsford, Mass., assignor to General Electric Company, a corporation of New York Filed Mar. 1, 1967, Ser. No. 619,717
Int. Cl. B44d 1/14; H01b 3/30, 7/02
U.S. Cl. 117—218 8 Claims

ABSTRACT OF THE DISCLOSURE

A method of manufacturing thin wall wire by first providing an insulation layer of chemically cross-linked polyethylene over a metal conductor. The surface of the insulation is etched over its circumference, and a flame retardant coating of a thermosetting, halogenated polyolefin is applied uniformly over the polyehylene insulation.

Figure 2:
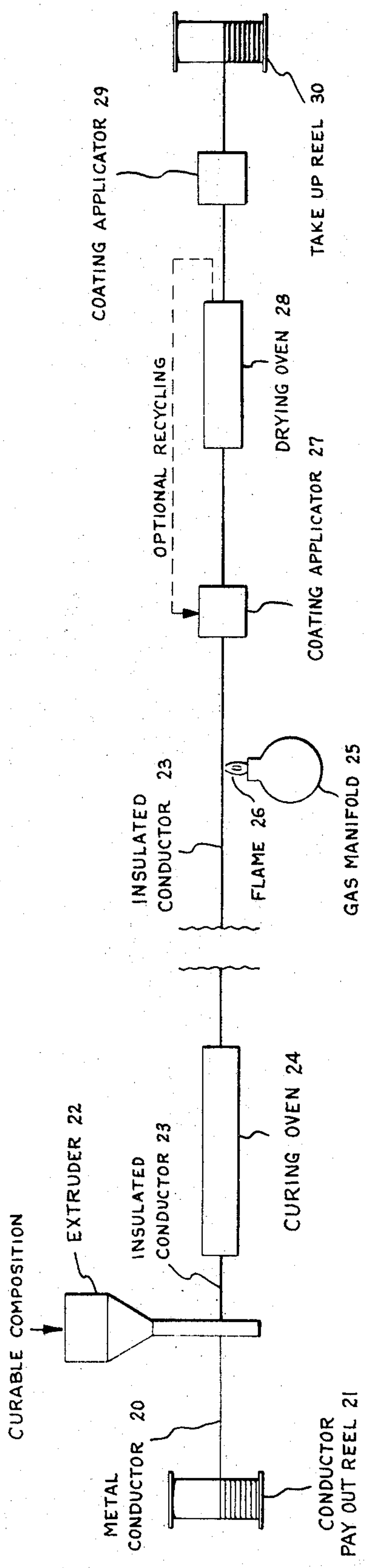

As used herein and in the appended claims, the phrase "thin wall" or "thin wall wire" refers to insulation for wire having a thickness of from about 5 to 20 mils. Also, the terms "wire" and "cable" are used herein and in the appended claims as synonymous terms.

For the past several years there has been a demand, especially in the electronic industry, for thin wall, low cost wire or cable exhibiting high electrical integrity and good physical properties. Because of its extensive use in the electronic industry, this wire is sometimes referred to as thin wall electronic wire, and is adaptable for carrying a voltage load of up to 1000 volts. This wire has wide use in many applications such as in data processing equipment, instrumentation, navigation equipment, guidance systems, radar, nuclear electronic devices, microwave and mobile radio, electronic equipment and electro-medical devices, as well as in aerospace and missile equipment. Bcause of this wide range of applications, the wire must possess versatile properties and further should be economical in cost. These properties include high dielectric strength, low specific inductive capacitance, high thermal stability, resistance to solder iron damage, good radiation resistance, good resistance to corrosive chemicals and solvents, and no-outgassing at extremely low pressures; e.g. $10^{-6}$ torrs. In addition, it is important that the thin wall wire exhibit high bond strength to conventional encapsulating materials and further be substantially flame retardant as determined by a horizontal flame test in accordance with Federal Specification J–C–98, Method 5211, wherein indicator papers are placed three and one-half inches on either side of the point of flame application and the finished wire shall be self-extinguishing and not carry flame to the paper indicators. Quite obviously, it is difficult to achieve this broad spectrum of electrical and physical properties for a thin wall wire that can offer such a wide range of applications, and is particularly true for achieving a thin wall which is flame retardant without a sacrifice in any or more of the other properties. Presently, there are available two commercial thin wall elctronic wires which exhibit most of these desired properties; namely polytetrafluoroethylene (Teflno) wire and irradiated polyethylene wire. Both of these products, however, are high in cost and are not easily encapsulated.

This invention has as its object to provide a method for manufacturing low cost, thin wall wire which exhibits good electrical and physical properties and in particular is characterized by substantial flame retardance and high bond strength to conventional encapsulating materials.

In its broad aspect, the thin wall wire of this invention comprises a metallic conductor surrounded by a layer of insulation comprising chemically cross-linked polyethylene. The insulation layer has a nominal wall thickness of from about 5 to 20 mils, and more particularly 10 to 15 mils. The surface of the insulation layer is etched over its circumference sufficient to improve its bonding properties, and a flame retardant coating of a thermosetting, halogenated polyolefin is then applied substantially uniformly over the insulation layer. The flame retardant coating is integrally bonded with the insulation layer and has a thickness of about 0.5 to 2 mils, and more preferably about 1 to 1.5 mils. The resulting thin wall wire of light weight and small diameter exhibits all of the desired properties requisite for electronic and aerospace applications, including flame retardance and high bond strength to conventional encapsulating materials, whereby one wire may be used in a wide range of applications.

Figure 1:
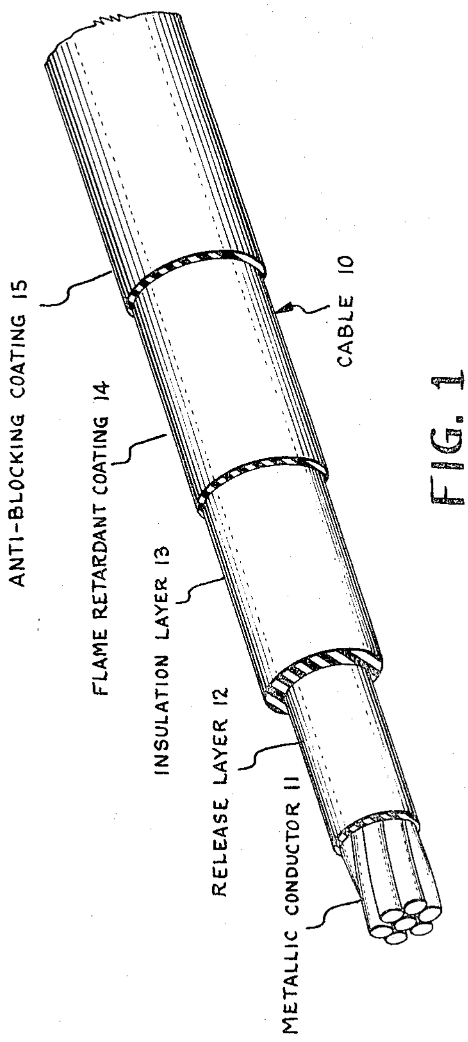

In order to describe the invention in greater detail, reference is now made to the accompanying drawings, illustrating a preferred embodiment of the invention, in which: FIG. 1 is a perspective view of a cable of typical construction with portions thereof cut away for the purpose of better illustrating its construction and showing the features of the invention; and FIG. 2 diagrammatically illustrates the process of making the wire of this invention.

Referring to FIG. 1, there is illustrated a thin wall wire or cable indicated generally by the numeral 10, falling within the scope of this invention such as electronic wire for radar or missile wiring and adaptable for carrying a voltage load of up to about 1000 volts. The wire includes a metallic conductor 11 illustrated in the form of a stranded conductor, although it should be understood that the conductor may comprise a solid conductor. In general, conductors for thin wall wire or cable may range in size from No. 24 to No. 14 AWG having a diameter of 0.025 inch to 0.069 inch, and typically may be formed from stranded copper, stranded tinned copper, stranded silver plated copper or stranded aluminum, including their alloys. It is conventional to provide a release layer 12 between metallic conductor 11 and insulation layer 13, thereby making it possible to readily strip the insulation from the conductor. The release layer 12 may comprise a paper or plastic wrapped around the metal conductor, or may be an organopolysiloxane, e.g. a dimethyl silicone fluid, applied as by spraying to the metal conductor. Insulating layer 13, desirably having a nominal wall thickness of 10 to 15 mils, is fabricated, as by extrusion, over the metal conductor and a release layer (if used). The insulation layer comprises chemically cross-linked polyethylene, which is a well known material and is readily available in the uncured state.

The insulation layer 13 is surface etched over its circumference, as by flame etching or corona etching, to improve its bonding properties. A flame retardant coating 14 of a halogenated polyolefin is bonded to the etched surface of the insulation layer.

When the thin wall insulated wire is wound or taken up on a reel, there is a tendency for adjacent wires in the reel to stick together or "block" thereby damaging the coating when unreeled. In order to overcome this difficulty, antiblocking coating 15 is applied over the surface of the insulated wire. A typical antiblocking coating comprises a water solution of a methyl cellulose-protein mixture which may be applied to the insulated wire by passing the wire through a bath of the mixture and subsequently drying the coating at an elevated temperature of about 225° F.

Referring now to FIG. 2 which shows diagrammatically a process for making wire of this invention, metallic conductor 20, which may have a release layer formed thereon, is passed a payout reel 21 through an extruder 22 where the polyethylene insulation composition, having incorporated therein a suitable curing agent, is extruded to form a coating of insulation over the conductor. The insulated conductor 23 emerging from the extruder is passed through a curing oven 24 where the fabricated product is cured such as by conventional steam curing at high pressure whereby cross-linking of the polyethylene is effected. At this stage of the operation, the insulated wire may be taken up on a reel (not shown) and subsequently passed to the second coating operation for applying a flame retardant coating, or where desired the insulated wire may be passed directly from the curing step to the second coating step.

The insulated wire is then surface etched, preferably flame etched by impinging a gas flame on the surface thereof, and although etching may be accomplished by other means such as corona etching, the invention will be described hereinafter with reference to flame etching. In this operation, the insulated wire 23 is passed over a gas manifold 25 to expose the surface of insulation to a flame 26 thereby heating the wire and etching the surface over its circumference. The duration of flame treatment necessary for obtaining a surface of improved bonding characteristics is dependent upon such factors as the temperature of the flame, the physical strength of the cured insulation layer, and the linear spread of the metallic conductor and its diameter. Therefore, it may be desirable under some conditions to prolong the flame treatment or to provide for two or more gas burners spaced around the insulated wire. However, the wire, including the conductor and insulation layer, is relatively thin and therefore the flame treatment should be adjusted as not to significantly alter the electrical or physical properties of the wire or to distort or otherwise damage the wire.

A thermosetting, halogenated polyethylene solution, as a flame retardant composition, is supplied to a coating applicator 27, and the etched wire 23 is passed through at least one such applicator for applying a coating to the wire. In the preferred embodiment, the etched wire is passed through the applicator while still hot from the flame treatment thereby attaining more uniform coating. Also, heat radiating from the insulation facilitates evaporation of the solvent and further may initiate or expedite curing of the halogenated polyethylene. The flamecoated insulated wire is then set through a drying oven 28, typically operated at a temperature of from 250° F. to 300° F., to evaporate the solvent in the coating and further to initiate or effect curing of the flame retardant coating. This coating should have a thickness of about 0.5 to 2 mils, and therefore it may be desirable to recycle the coated wire from the oven 28 back through the applicator 27. Also, one or more additional coating applicators may be employed in the process. The dried and cured flame retardant coating is substantially integrally bonded with the insulation layer. An antiblocking coating is applied at coating applicator 29, and the completed wire product having a flame retardant coating is finlly wound on take-up reel 30.

A small amount of an inert filler is usually incorporated into the polyethylene insulation material to increase its opacity. Suitable fillers may include, for example, aluminum silicate or titanium dioxide, and may be present in the order of 2 to 5% by weight of the insulation composition. The polyethylene insulating composition also inclues a small amount of an antioxidant, such as polymerized dihydrotrimethyl quinoline (disclosed and claimed in U.S. Pat. No. 3,296,189) to improve aging characteristics of the composition. In general, the antioxidant may comprise about 0.25 to 2% by weight of the polyethylene insulation composition. Where desired, the insulation composition may include a dye or pigment for rendering the insulation a particular color, or certain processing aids whose uses are well known and may be determined by those skilled in the art.

In preparing the insulation composition, the polymer and other additives such as antioxidant are compounded or intimately admixed as in a Banbury. A suitable curing agent, desirably a tertiary peroxide, is then incorporated into the admixture to effect cross-link of the polymer upon curing. The compounding operation containing the curing agent is conducted within a temperature range high enough to render the composition sufficiently plastic to work but below the reacting temperature or decomposition temperature of the curing agent so that substantially little or no decomposition of the curing agent occurs during a normal cycle. The resulting compounded admixture is subsequently fabricated as by extrusion in a continuous process onto the conductor which may have formed thereon a release layer. The fabricated product is then cured such as by conventional steam curing at about 250 p.s.i.g. and 400 to 410° F.

Desirably, the curing agent employed in the operation is a peroxide, preferably a tertiary peroxide, and characterized by at least one unit of structure

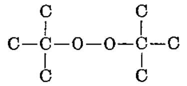

which decomposes at a temperature in excess of 130° C. The use of these peroxide curing agents in effecting cross-linking in polymeric compounds is adequately described in U.S. Pats. 3,079,370 and 2,888,424, both to Precopio and Gilbert, which patents are incorporated in this specification by reference. Another useful curing agent includes the tertiary diperoxides such as the acetylenic diperoxy compounds disclosed in U.S. Pat. 3,214,422, which patent is also incorporated in this specification by reference.

The proportion of peroxide curing agent used depends largely on the mechanical properties sought in the cured product, for example, hot tensile strength. A range of from about 0.5 to 10 parts peroxide by weight per hundred parts of total polymeric content satisfies most requirements, and the usual proportion is of the order of three to four parts peroxide. In a typical production operation employing a tertiary peroxide as a curing agent, compounding is conducted at a temperature of from about 100 to 130° C., and preferably from 100 to 120° C. If compounding is conducted at a temperature much higher than the stated maximum, the peroxide will decompose thereby causing premature curing of at least a portion of the polymeric compounds. As a consequence, the compound will be difficult to fabricate and the final product will exhibit an irregular or roughened surface.

The flame retardant compositions useful in this invention include thermosetting halogenated polyolefins, and include, for example, chlorinated polyethylene, chlorosulfonated polyethylene, and fluorinated propylene copolymers. I have found as particularly useful thermosetting chlorosulfonated polyethylene, which is commercially available and sold by one manufacturer under the trademark "Hypalon." In the Hypalon series, the chlorine ranges from about 29 to 40% by weight and the sulfur from about 1 to 1.5% by weight. The halogenated polyolefin contains a small amount of a suitable curing agent, such as a metal oxide (e.g., magnesium oxide), so that with the temperature employed in the process of manufacturing the wire, as well as with time, the halogenated polyolefin is cured or cross-linked in situ. Where desired, the flame retardant coating may contain a coloring pigment or dye for the purpose of color-coding. A suitable pigment may include titanium dioxide and may be present in the amount of from about 30 to 45% by weight of total pigment and vehicle solids. Also, a small amount of a non-combustible additive may be added to the coating composition to further promote flame retardance, such as antimony oxide in the range of about 5 to 10% by weight of total solids.

The flame retardant coating is generally applied in solution or in suspension, and therefore a suitable solvent is employed which can be substantially volatilized from the coating composition after the coating has been applied. Suitable solvents, such as might be used in solubilizing chlorosulfonated polyethylene, include benzene, toluene, xylene, and similar aromatic hydrocarbons, as well as such chlorinated aliphatic hydrocarbons as tetrachloroethylene, methylenechloride, ethylidenechloride, and the like, as well as combinations thereof. The amount of solvent employed can be varied widely and will depend upon such factors as the thickness of the coating desired, the specific flame retardant composition employed and the type of solvent, but generally should be sufficient to provide about 10 to 50% by weight of total solids. The flame retardant coating may be applied in one or more applications, and generally after evaporation of the solvent should have a thickness of about 0.5 to 2 mils, and more preferably 1 to 1.5 mils. If the flame retardant coating is too thick, the coating will have a deleterious effect on aging thereby causing fracturing of the insulation layer, or may cause out-gassing at extremely low pressures, or may not permit the evaporation of all of the solvent thereby causing blocking or tackiness. In general, it is desirable to provide the minimum amount of coating to pass the flame retardant test.

The invention is further illustrated by the following example: An insulation composition was prepared comprising about 95.09% by weight of polyethylene, 1.785% polymerized 1,2-dihydro-2,2,4-trimethylquinoline (an antioxidant) and 3.125% di-α-cumyl peroxide (curing agent), all percentages being by weight. The compounded composition was extruded at a wall thickness of 10 mils on a number 20 AWG stranded tinned copper conductor, and cured in a steam chamber maintained at a pressure of about 250 p.s.i.g. The insulated wire was then flame etched by impinging a natural gas flame emanating from a gas manifold onto the surface of the insulation layer. The etched wire was then passed through a coating applicator containing 25% by weight compounded, thermosetting, chlorosulfonated polyethylene dissolved in a mixture of toluene and methylene chloride to form a final coating on said insulation layer having a nominal thickness of about 1 to 1.5 mils. The coated wire was then passed through a drying oven maintained at a temperature of about 250° F.

The cured insulation composition of this wire had a specific gravity of 0.93, a tensile strength of 2,200 p.s.i. and an elongation of 300%. The finished wire had a specific inductive capacitance at one megacycle of 2.7 and an insulation resistance of greater than 30,000 megohms-1000 feet.

Numerous tests conventional in evaluating wire of this type were conducted and compared with other known conventional thin wall wires. The wire made as described above in accordance with the invention is designated herein below as Sample 1, and was compared to two known commercially available thin wall electronic wires designated hereinafter as Samples 2 and 3. Sample 2 comprised a No. 20 AWG copper conductor having an irradiated polyethylene insulation of about 10 mils in thickness. Samples 3 comprised a No. 20 AWG copper conductor having a polytetrafluoroethylene (Teflon) insulation of about 10 mils in thickness.

The wire samples were tested for bonding strength to conventional encapsulating or potting compounds. These compounds are well known in the art and include, for example, epoxy compounds, polyurethane compounds and silicon compounds. The waxes and hot melt type compounds, however, are generally not useful for thin wall wire because of a relatively low temperature limitation. The compounds are poured or molded and when cured should exhibit a minimum of shrinkage. In addition, the encapsulating materials should be capable of withstanding sudden temperature changes, afford protection against ambient conditions other than temperature such as moisture, fungus growth, chemical contamination and irradiation, and also should be resistant to mechanical shock. The tests were conducted by embedding the wire samples one inch deep in encapsulating or potting compositions and the encapsulating compositions were allowed to cure. The force, in pounds, necessary to break the bond between the wire and cured potting compound was measured by means of an Instrom testing machine. The results are shown in Table 1 below.

TABLE 1.—BOND STRENGTH TO ENCAPSULATING COMPOUNDS

| | Sample | | |
|---|---|---|---|
| Encapsulating compound | 1 | 2 | 3 |
| Epoxy compound No. 2651 Stycast with No. 9 Catalyst [1] | 28.3 | 12.8 | 5.1 |
| Polyurethane compound No. CPC-16 Stycast [1] | 18.3 | 12.0 | 1.5 |
| RTV 616 Silicone with GE SS4120 Primer [2] | 6.4 | 5.6 | 2.3 |

[1] Manufactured by Emerson & Cumings.
[2] Manufactured by General Electric.

The results set forth in Table 1 show that the thin wall wire of this invention is very superior in bond strength to other known commercial thin wall wires.

The wire of this example was subject to a flammability test performed in accordance with the horizontal flame test of Federal Specification J-C-98, Method 2511, with indicator papers placed three and one-half inches on either side of the point of the flame application. This wire passed the flame test, while a substantially similar wire but having no coating of the thermosetting, chlorosulfonated polyethylene failed the test, thus showing the superiority of the coated wire.

Insulation shrinkage was measured after six hours in an air circulating oven at 225° C. ± 3° C. according to MIL-W-81044, paragraph 4.7.5.7. Sample 1 had zero shrinkage, whereas Sample 2 shrunk 1/64 inch.

A soldering test was performed by measuring the insulation shrinkage after five seconds immersion in molten 60–40 solder maintained at approximately 320° C. according to MIL-W-16878D, paragraph 4.4.2.6. The results showed substantially zero percentage shrinkage for Sample 1 and 1/64 inch shrinkage for Sample 2.

Solder iron resistance test was determined by exposing the wires of Sample 1 to a solder iron having an 80 watt element at 650° F. using a thrust of 160 grams. The measure of resistance to solder iron damage was the time to expose the metallic conductor. For Sample 1 the time was greater than 10 minutes. This compared very closely to wires of Sample 2 and 3 which are regarded as demonstrating excellent resistance.

A smoke test was conducted in still air. An electric current was passed through the wire and the temperature calculated at the time that smoke became visible according to the procedure established by MIL-W-81044, paragraph 4.7.5.10. The results of this test are shown in the following tabulation:

| | Smoke temperature, ° C. |
|---|---|
| Sample 1 | 290 |
| Sample 2 | 260 |

A cold bend test was performed wherein a sample wrapped around a 3/4 inch mandrel with a 1 lb. weight attached to one end thereof while at −65° C. ± 2° C. after four hours exposure was visually and electrically tested for flaws according to the standards set by MIL-W-81044, paragraph 4.7.5.10. Sample 1 showed no surface cracking and exhibited a break-down voltage, after 5 hours in water, of 13.8 kilovolts. Sample 2 showed no surface cracks and exhibited a break-down voltage, after 5 hours in water, of 7.4 kilovolts.

An abrasion resistance test was conducted in an abrasion testing machine conforming to MIL-T-5438. A 1/2 lb. weight with a 1 lb. tension, an A bracket, and 400 grit tape were used. Failure was recorded in accordance with MIL-W-81044, paragraph 4.7.5.9.1. The results, as measured in average inches of tape to failure were, for Sample 1, 53 inches, and for Sample 2, 30 inches.

A cut-through test was performed consisting of the application of a pressure by means of a V block with a radius of 0.0001 inch at a constant rate of 0.2 inch per minute and recording the pound force to cause failure.

The results were measured in the pound force to cause failure at 23° C. Sample 1 failed at 6.4 lbs. and Sample 2 failed at 6.7 lbs.

A wrap test was performed with specimens of wire, each 12 inches long, wrapped around a ¼ inch mandrel, and dielectric tested according to the standard established by MIL–W–81044, paragraph 4.7.5.11. The results showed for Sample 1 a break-down voltage of 17,900 and for Sample 2 a break-down voltage of 11,300.

Samples of the wire of this invention were exposed to radiation in the form of high energy electrons from an 800 kilovolt electron source at a rate of 10 to 12 megarads per minute. After exposure to radiation the samples were wrapped one turn about a ½ inch mandrel and a voltage of 2.2 kilovolts applied for 1 minute. The voltage was then raised to break-down. Samples 1 and 2 as above described performed well on this test, while Sample 3 performed very poorly.

The wire of this invention also is resistant to many solvents and reactive chemicals. According to the fluid immersion test, MIL–W–81044, paragraph 4.7.5.15, samples of the wire were immersed for 20 hours in representative organic fluids, the samples removed and then tested for degradation in voltage strength and abrasion resistance. Sample 1 showed no significant change in either dielectric or abrasion resistance properties after immersion in isopropyl alcohol (MIL–F–5566), hydraulic fluid (MIL–H–5606), JP–4 jet fuel (MIL–J–5624), ethyl alcohol (MIL–A–6091), lubricating oil (MIL–L–7808) and Skydrol 500A.

It is especially desirable in missile and aerospace applications that the wire be substantially non-outgassing at extremely low pressures. Outgassing tests were performed in a vacuum system evacuated to a pressure of approximately $10^{-6}$ millimeters of mercury. The rate of evacuation of the empty chamber is shown in Table 2. In the absence of outgassing, the pressure decay should be substantially equivalent, and of approximately the same order of magnitude, as the corresponding values for the empty chamber during evacuation at any period of time. Thus, outgassing is characterized by a slower decay in pressure. It can be seen from Table 2, below, that Sample 1 exhibited a decay of pressure substantially corresponding to the decay of pressure shown for the empty chamber, and therefore may be considered as non-outgassing.

TABLE 2.—OUTGASSING TEST

| | Empty chamber, mm. Hg | Chamber with Sample 1, mm. Hg |
|---|---|---|
| Time, minutes: | | |
| 2 | $9\times10^{-5}$ | $6\times10^{-4}$ |
| 3 | $6\times10^{-5}$ | $3.4\times10^{-4}$ |
| 5 | $3.2\times10^{-5}$ | $2\times10^{-5}$ |
| 15 | $8.2\times10^{-6}$ | $7.1\times10^{-6}$ |
| 25 | $4.5\times10^{-6}$ | $5.1\times10^{-6}$ |
| 60 | $2.2\times10^{-6}$ | $2.5\times10^{-6}$ |

An accelerated heat aging test was conducted at 225° C. According to this test, one inch of insulation is removed from each end of a 20 inch sample of the finished wire. The central portion is bent halfway around a Teflon taped steel mandrel having a one and one-half inch diameter. The ends of the specimen are tied together and loaded with a one pound weight. The specimen was then placed in an air circulating oven for a period of four hours at a tempertaure of 225°±4° C., and the velocity of air which passed the specimen was between 100 and 300 feet per minute. The specimen was then cooled to room temperature, removed from the mandrel and straightened by securing one end of the specimen to the mandrel and the other to the one pound load weight. The mandrel was rotated slowly until the full length of the specimen was wrapped around the mandrel and was under the specified tension with adjoining coils in contact. The mandrel was then rotated in a reverse direction until the full length of the wire which was outside during the first wrapping is now next to the mandrel. The specimen was then removed and immersed in a 5% solution of sodium chloride in water at a temperature of 23° C.±3° C. with the ends protruding one and one-half inches from the surface of the liquid. After five hours immersion, the specimen was tested for voltage breakdown and should sustain 2500 volts RMS. In conducting the test, the initial voltage should be greater than 500 volts and the rate of increase should be 500 volts per second. The wire of Sample 1 made in accordance with this invention had a voltage breakdown of 12.3 kilovolts. This can be equated to a temperature rating of about 125° C.

The foregoing tests demonstrate the superior performance characteristics and versatility of the wire of this invention withou a sacrifice in one or more of these properties.

I claim:

1. A method of manufacturing an insulated wire which comprises (a) extruding about a metallic conductor a thin wall layer of insulation comprising polyethylene and a curing agent, said insulation layer having a nominal wall thickness of about 5 to 20 mils;

(b) curing said layer of insulation;

(c) etching the surface of said cured insulation layer over its circumference;

(d) coating the etched surface of said cured insulation layer with a thermosetting, halogenated polyolefin containing a curing agent, said coating having a thickness of about 0.5 to 2 mils, and subsequently curing said coating; whereby said insulated wire is substantially flame retardant as determined by a horizontal flame test in accordance with Federal Specification J–C–98, Method 5211 wherein the indicator papers are placed three and one-half inches on either side of the point of flame application, and exhibits high bond strength to conventional encapsulating materials.

2. A method according to claim 1 wherein said surface of said cured insulation layer is flame etched by impinging a gas flame on said surface.

3. A method according to claim 1 wherein said thermosetting halogenated polyolefin is chlorosulfonated polyethylene.

4. A method according to claim 1 wherein said insulation layer has a thickness of about 10 to 15 mils.

5. A method according to claim 1 wherein said coating has a thickness of about 1 to 1.5 mils.

6. A method of manufacturing an insulated wire which comprises (a) extruding about a metallic conductor a thin wall layer of insulation comprising polyethylene and a curing agent, said insulation layer having a nominal wall thickness of about 5 to 20 mils;

(b) curing said layer of insulation;

(c) impinging a gas flame on the surface of said cured insulation layer to etch said layer over its circumference;

(d) coating the etched surface of said cured insulation layer with a thermosetting, chlorosulfonated polyethylene containing a curing agent, said coating having a thickness of about 0.5 to 2 mils, and subsequently curing said coating; whereby said insulated wire is substantially flame retardant as determined by a horizontal flame test in accordance with Federal Specification J–C–98, Method 5211 wherein the indicator papers are placed three and one-half inches on either side of the point of flame application, and exhibits high bond strength to conventional encapsulating materials.

7. A method according to claim 6 wherein said insulation layer has a thickness of about 10 to 15 mils.

8. A method according to claim 6 wherein said coating has a thickness of about 1 to 1.5 mils.

(References on following page)

References Cited

UNITED STATES PATENTS

| | | | |
|---|---|---|---|
| 2,925,354 | 2/1960 | Berardinelli et al. | 117—161UHHX |
| 2,939,904 | 6/1960 | Ingmanson et al. | 117—161UHH |
| 3,076,720 | 2/1963 | Rice et al. | 117—46FCX |
| 3,079,370 | 2/1963 | Precopio et al. | 260—94.9G |
| 3,269,862 | 8/1966 | Lanza et al. | 117—218 |
| 3,322,612 | 5/1967 | Burd | 117—161UHHX |

WILLIAM D. MARTIN, Primary Examiner

R. HUSACK, Assistant Examiner

U.S. Cl. X.R.

117—46, 47, 75, 136; 174—120